US008328626B2

(12) United States Patent
Hornik

(10) Patent No.: US 8,328,626 B2
(45) Date of Patent: Dec. 11, 2012

(54) WAGERING GAME WITH PROGRESSIVE GAME TRIGGERED BY MULTIPLE PLAYERS

(75) Inventor: Jeremy M. Hornik, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 764 days.

(21) Appl. No.: 11/990,381

(22) PCT Filed: Sep. 1, 2006

(86) PCT No.: PCT/US2006/034385
§ 371 (c)(1),
(2), (4) Date: Feb. 12, 2008

(87) PCT Pub. No.: WO2007/028108
PCT Pub. Date: Mar. 8, 2007

(65) Prior Publication Data

US 2009/0117974 A1 May 7, 2009

Related U.S. Application Data

(60) Provisional application No. 60/713,535, filed on Sep. 1, 2005.

(51) Int. Cl.
*A63F 13/00* (2006.01)
*A63F 13/12* (2006.01)
*A63F 9/00* (2006.01)

(52) U.S. Cl. ................. 463/25; 463/16; 463/20; 463/26

(58) Field of Classification Search .............. 463/16–20, 463/25–26
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,861,041 | A | 8/1989 | Jones et al. | 273/292 |
| 4,948,134 | A | 8/1990 | Suttle et al. | 273/85 |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 463/12 |

(Continued)

FOREIGN PATENT DOCUMENTS

CA 2 334 546 8/2001

(Continued)

OTHER PUBLICATIONS

Article for "Easy Riches" by Sigma Game, Strictly Slots, 1 page (Aug. 2001).

(Continued)

*Primary Examiner* — Peter Vo
*Assistant Examiner* — Bach Hoang
(74) *Attorney, Agent, or Firm* — Nixon Peabody LLP

(57) ABSTRACT

A method of conducting a group wagering game that includes a special award that is attainable by players at a plurality of gaming machines. The method includes receiving wagers from players at the plurality of machines for playing individual wagering games. In response to a triggering condition that is associated with one of the machines, the group wagering game is presented including an opportunity to fulfill at least one of a plurality of victory conditions. In response to all of the plurality of victory conditions being fulfilled, the special award is awarded to the machine associated with a next triggering condition.

18 Claims, 9 Drawing Sheets

U.S. PATENT DOCUMENTS

| | | | | |
|---|---|---|---|---|
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 C P |
| 5,393,057 | A | 2/1995 | Marnell, II | 273/85 CP |
| 5,417,430 | A | 5/1995 | Breeding | 273/292 |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,577,959 | A | 11/1996 | Takemoto | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,839,956 | A | 11/1998 | Takemoto | 463/25 |
| 5,848,932 | A | 12/1998 | Adams | 463/20 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 * | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,241,608 | B1 | 6/2001 | Torango | 463/27 |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,347,996 | B1 | 2/2002 | Gilmore et al. | 463/17 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,375,569 | B1 * | 4/2002 | Acres | 463/27 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |

| | | | | |
|---|---|---|---|---|
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,648,762 | B2 | 11/2003 | Walker et al. | 463/25 |
| 6,656,048 | B2 * | 12/2003 | Olsen | 463/25 |
| 6,656,052 | B2 | 12/2003 | Abramopoulos et al. | 463/47 |
| 6,676,513 | B2 | 1/2004 | Gauselmann | 463/20 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,887,154 | B1 | 5/2005 | Luciano, Jr. et al. | 463/26 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 7,252,288 | B2 * | 8/2007 | Seelig et al. | 273/143 R |
| 7,614,948 | B2 * | 11/2009 | Saffari et al. | 463/19 |
| 7,662,040 | B2 * | 2/2010 | Englman et al. | 463/42 |
| 7,828,642 | B2 * | 11/2010 | Duhamel | 463/18 |
| 2001/0018361 | A1 * | 8/2001 | Acres | 463/27 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0109306 | A1 | 6/2003 | Karmarkar | 463/40 |
| 2003/0148807 | A1 | 8/2003 | Acres | 463/40 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0051239 | A1 * | 3/2004 | Seelig et al. | 273/138.1 |
| 2004/0092304 | A1 | 5/2004 | George | 463/29 |
| 2004/0259624 | A1 * | 12/2004 | Duhamel | 463/16 |
| 2005/0003880 | A1 | 1/2005 | Engleman | 463/16 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0075156 | A1 * | 4/2005 | Seelig et al. | 463/1 |
| 2005/0096130 | A1 | 5/2005 | Mullins | 463/27 |
| 2005/0137010 | A1 | 6/2005 | Enzminger et al. | 463/25 |
| 2005/0192088 | A1 | 9/2005 | Hartman et al. | 463/27 |
| 2005/0215313 | A1 | 9/2005 | O'Halloran | 463/26 |
| 2006/0003829 | A1 | 1/2006 | Thomas | 463/20 |
| 2006/0019737 | A1 | 1/2006 | Yang | 463/19 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0073877 | A1 | 4/2006 | Rodgers et al. | 463/20 |
| 2006/0073889 | A1 | 4/2006 | Edidin et al. | 463/27 |
| 2006/0116201 | A1 | 6/2006 | Gauselmann | 463/26 |
| 2006/0121971 | A1 * | 6/2006 | Slomiany et al. | 463/16 |
| 2006/0142079 | A1 | 6/2006 | Ikehara et al. | 463/27 |
| 2006/0142086 | A1 | 6/2006 | Blackburn et al. | 463/42 |

| | | | | |
|---|---|---|---|---|
| 2006/0154718 A1 | 7/2006 | Willyard et al. | 463/25 |
| 2006/0178203 A1* | 8/2006 | Hughes et al. | 463/20 |
| 2006/0183535 A1 | 8/2006 | Marks et al. | 463/20 |
| 2006/0183537 A1 | 8/2006 | Dickerson | 463/27 |
| 2006/0183538 A1 | 8/2006 | Michaelson et al. | 463/27 |
| 2006/0281527 A1 | 12/2006 | Dunaevsky et al. | 463/20 |
| 2006/0287077 A1 | 12/2006 | Grav et al. | 463/27 |
| 2007/0026941 A1 | 2/2007 | Block et al. | 463/29 |
| 2007/0054733 A1 | 3/2007 | Baerlocher | 463/27 |
| 2007/0060244 A1 | 3/2007 | Yaldoo et al. | 463/16 |
| 2007/0060271 A1 | 3/2007 | Cregan et al. | 463/16 |
| 2007/0060314 A1 | 3/2007 | Baerlocher et al. | 463/25 |
| 2007/0060319 A1 | 3/2007 | Block et al. | 463/27 |
| 2007/0060365 A1 | 3/2007 | Tien et al. | 463/42 |
| 2008/0015009 A1* | 1/2008 | Seelig et al. | 463/20 |
| 2010/0035674 A1* | 2/2010 | Slomiany et al. | 463/9 |

FOREIGN PATENT DOCUMENTS

| | | | |
|---|---|---|---|
| DE | 195 15 983 | A1 | 11/1996 |
| DE | 196 24 321 | A1 | 1/1998 |
| EP | 0 521 599 | A1 | 1/1993 |
| GB | 2 153 572 | A | 8/1985 |
| GB | 2 181 589 | A | 4/1987 |
| GB | 2 242 300 | A | 9/1991 |
| GB | 2 313 792 | A | 10/1997 |
| GB | 2 333 880 | A | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |
| WO | WO 03/083789 | A1 | 10/2003 |

OTHER PUBLICATIONS

Article for “Millioniser” by Glenn Haussman, Strictly Slots, pp. 50-53, 4 pages (Mar. 2004).

Product Sheet for “Big Games Safari,” IGT, 24 pages (2000).

“New ’97 Games,” International Gaming & Wagering Business, 24 pages (Mar. 1997).

PCT International Search Report for International Application No. PCT/US2006/20979 dated Nov. 13, 2006 (2 pages).

PCT International Search Report for International Application No. PCT/US2006/34385 dated Jan. 9, 2007 (3 pages).

* cited by examiner

WAGERING GAME WITH PROGRESSIVE GAME TRIGGERED BY MULTIPLE PLAYERS

RELATED APPLICATIONS

This application is a U.S. national stage application of International Application No. PCT/US2006/34385, filed Sep. 1, 2006, which is related to and claims priority to U.S. Provisional Patent Application No. 60/713,535 filed Sep. 1, 2005, titled "Wagering Game With Progressive Game Triggered By Multiple Players," each of which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a special award that is triggered based on conditions fulfilled by a group of players.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Some current wagering games fail to provide both a competitive aspect and a group-play aspect. For example, one problem associated with some current wagering games is that a player on a gaming machine is not encouraged to play toward a common goal with another player on a different gaming machine, wherein only one of the players is awarded a special award in response to achieving the common goal. Thus, some current wagering games provide each player with a goal that is specific only to the player.

In one type of current wagering game the player attempts to fulfill a plurality of gaming conditions. Upon fulfilling all of the gaming conditions, the player receives an award. If the player cannot fulfill all of the gaming conditions, the player may receive no award or a much smaller award. The players of this type of game are likely to become frustrated after fulfilling only some of the gaining conditions and, consequently, quit playing the game. Thus, the player's dissatisfaction with the game is likely to decrease profits of the game provider, e.g., a casino establishment.

Thus, a need exists for a gaming machine having a group aspect that, nevertheless, awards individual effort. The present invention is directed to satisfying one ore more of these needs and solving other problems.

SUMMARY OF THE INVENTION

According to one aspect of the present invention, a method of conducting a group wagering game includes a special award that is attainable by players at a plurality of gaming machines. The method further includes receiving wagers from players at the plurality of machines for playing individual wagering games. In response to a triggering condition that is associated with one of the machines, the group wagering game is presented including an opportunity to fulfill at least one of a plurality of victory conditions. In response to all of the plurality of victory conditions being fulfilled, the special award is awarded to the machine associated with a next triggering condition.

According to another aspect of the invention, a gaming system having a plurality of gaming machines for playing a wagering game includes a display and a controller. The display is for displaying a base game of the wagering game in response to receiving a wager from at least one of multiple players. The controller is coupled to the display and is programmed to present a group wagering game of the wagering game in response to an occurrence of a triggering condition. The group wagering game includes a plurality of victory conditions. After all victory conditions are fulfilled, the controller is further programmed to award a special award to a player of the multiple players that fulfills a special award condition.

According to yet another aspect of the invention, a method for conducting a wagering game on a gaming system includes receiving wagers from a plurality of players for playing the wagering game. Each player plays on a respective gaming machine of the gaming system. In response to achieving special triggering conditions, respective one or more players of the plurality of players are presented with respective rounds of a special event. The method further includes fulfilling a plurality of victory conditions based on selections made by one or more players of the plurality of players during the rounds of the special event. A special award is awarded to any player of the plurality of players that fulfills a special award requirement.

According to yet another aspect of the invention, a computer readable storage medium or media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1:
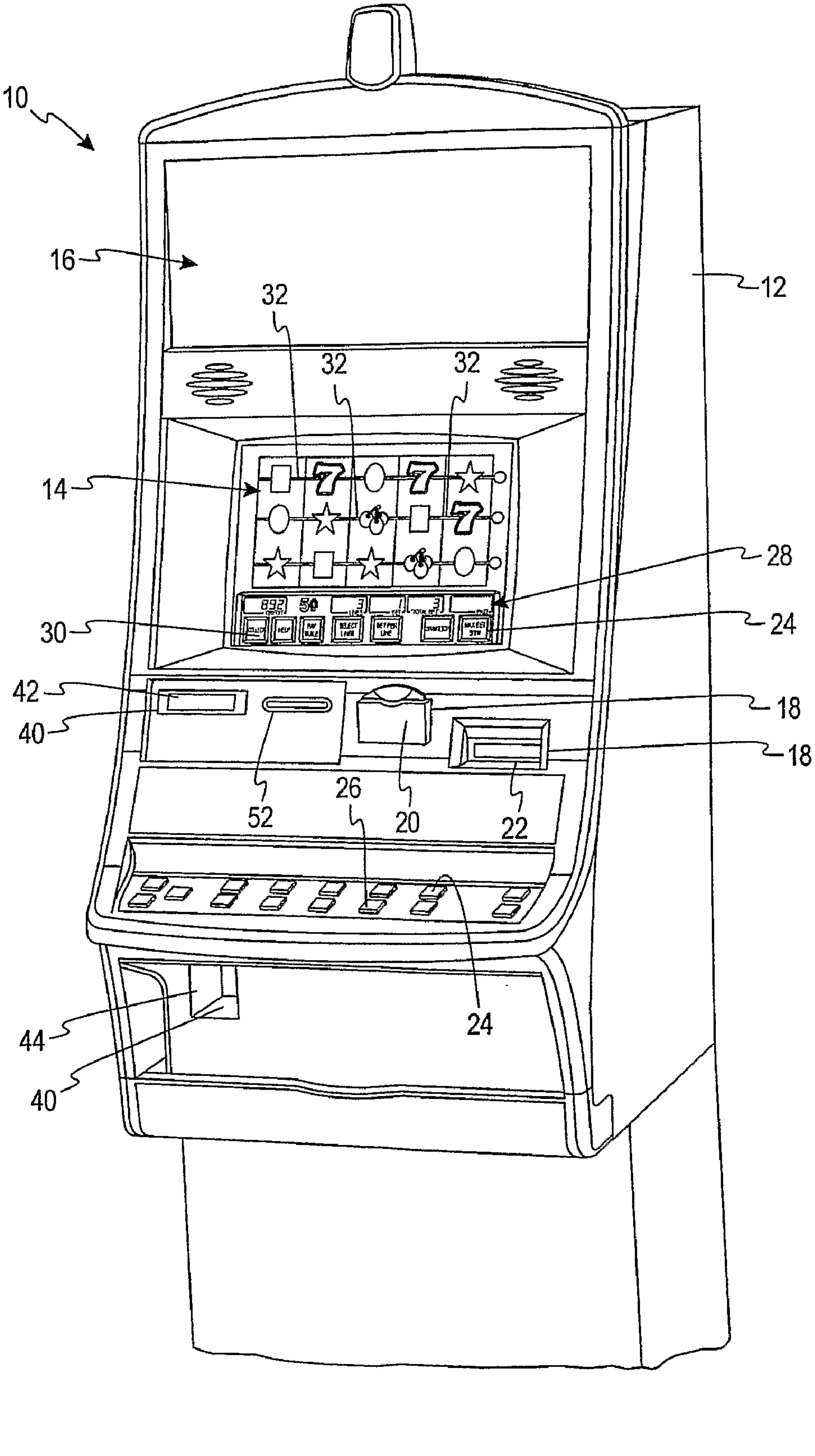
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
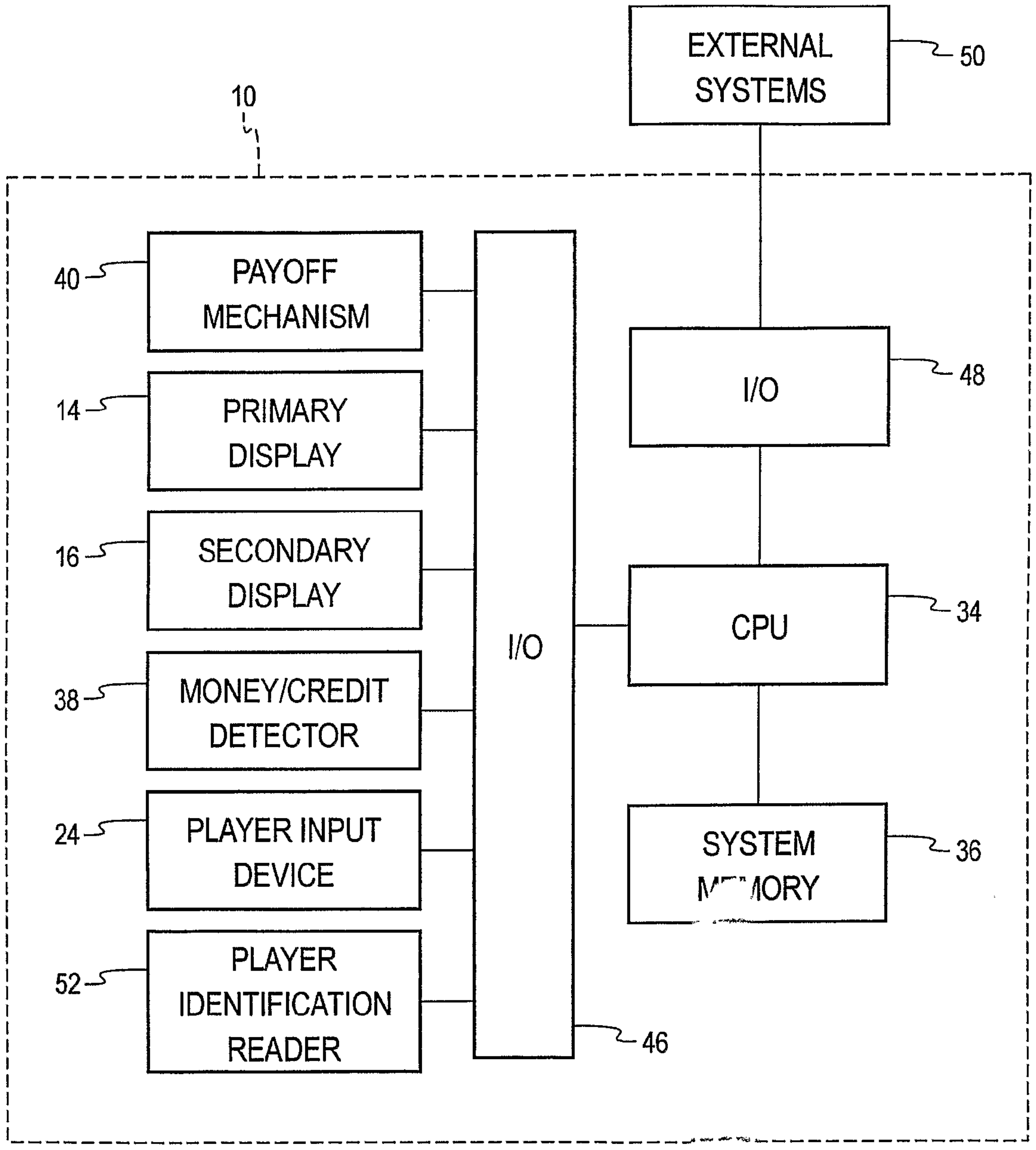
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
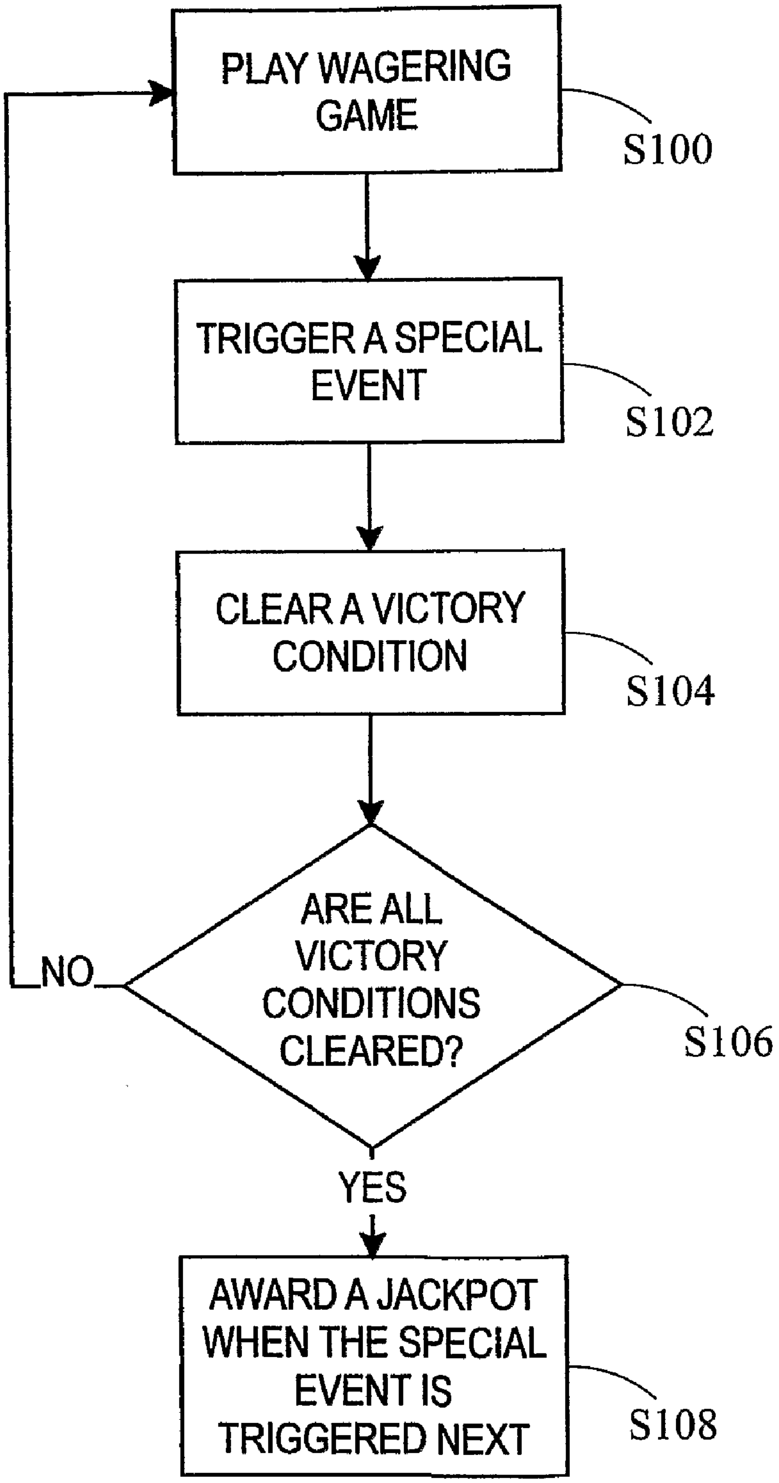
FIG. 3 is a flowchart representing a jackpot award process according to the present invention.

Referring to FIG. 3, at step S100 a player begins playing a base game of a wagering game on a gaming system. The gaming system includes, for example, a plurality of gaming machines 10 for playing a slots game, a poker game, or a keno game. The base game is a machine-level game, wherein each one of the gaming machines 10 plays an individual game.

While playing the wagering game, a special event (e.g., a bonus game of the wagering game) is triggered at step S102. The special event is a group game in which all players of the plurality of gaming machines 10 are capable of participating. For example, the special event is triggered when a predetermined arrangement of symbols lands on an active payline of a gaming machine 10.

At step S104, the player clears a victory condition of a plurality of victory conditions while playing the special event. The victory condition is cleared, or fulfilled, when the player satisfies a predetermined condition associated with the special event. For example, the victory condition is cleared when the player selects a correct symbol combination.

At step S106, it is determined whether all the victory conditions are cleared. If all the victory conditions are cleared, at step S108 a jackpot is awarded the next time that the special event is triggered by any player of the wagering game on any gaming machine 10 of the gaming system. Optionally, if all the victory conditions are not cleared, the special event ends and the player is taken back to play the wagering game (at step S100).

Figure 4:
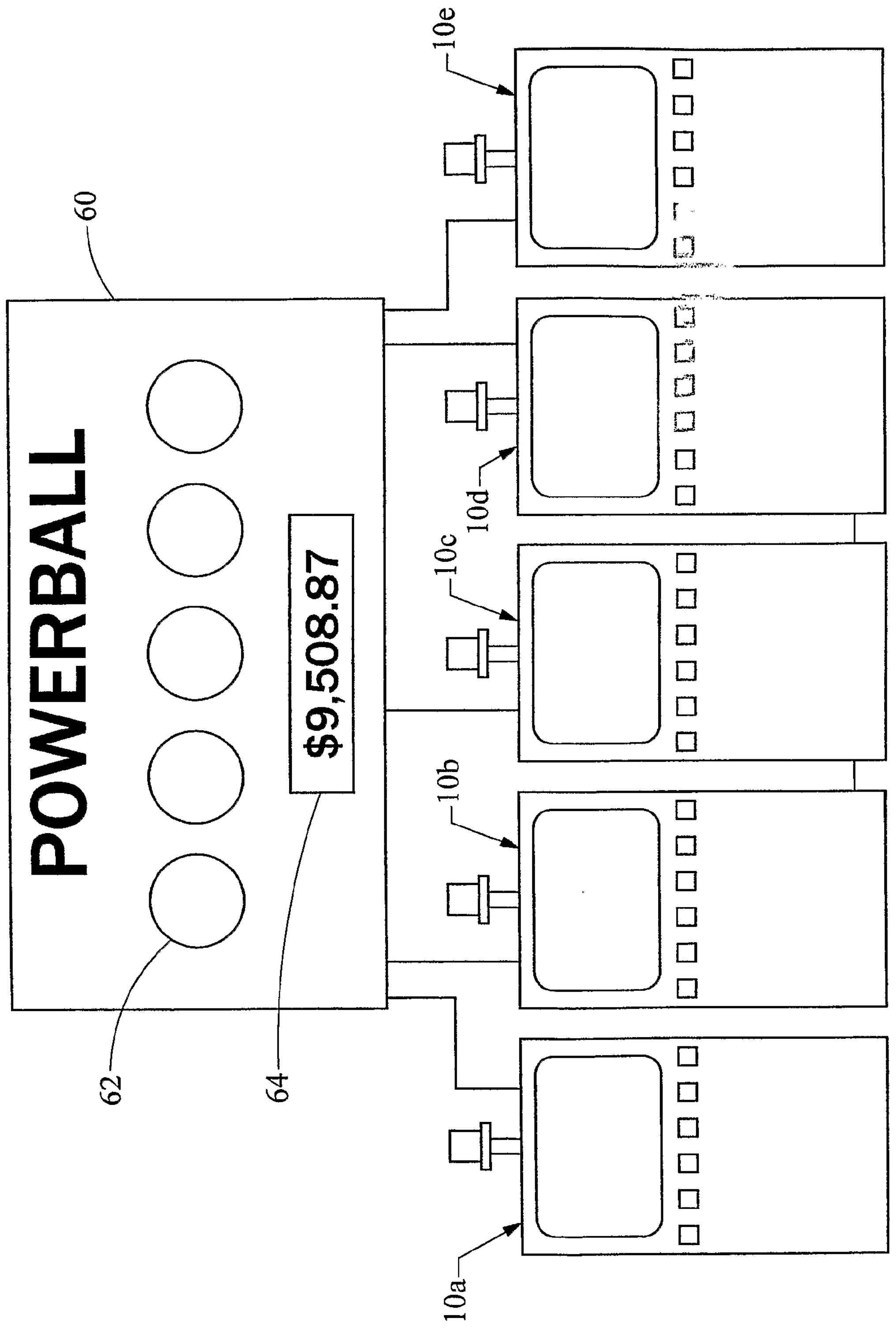
FIG. 4 is an illustration representing a plurality of gaming machines connected to an award sign, which displays a plurality of blank game balls.

Referring to FIG. 4, a gaming system includes a plurality of gaming machines 10*a*-10*e* that are coupled to a sign 60 for playing a wagering game. The sign 60 includes five symbol balls 62, which are initially blank. Each one of the balls 62 conceals a hidden number that, when revealed, represents a cleared victory condition associated with a progressive bonus game. The sign 60 further includes a progressive indicator 64 for displaying a current award value. For example, the current progressive jackpot is "$9,508.87," as displayed by the indicator 64.

Figure 5:
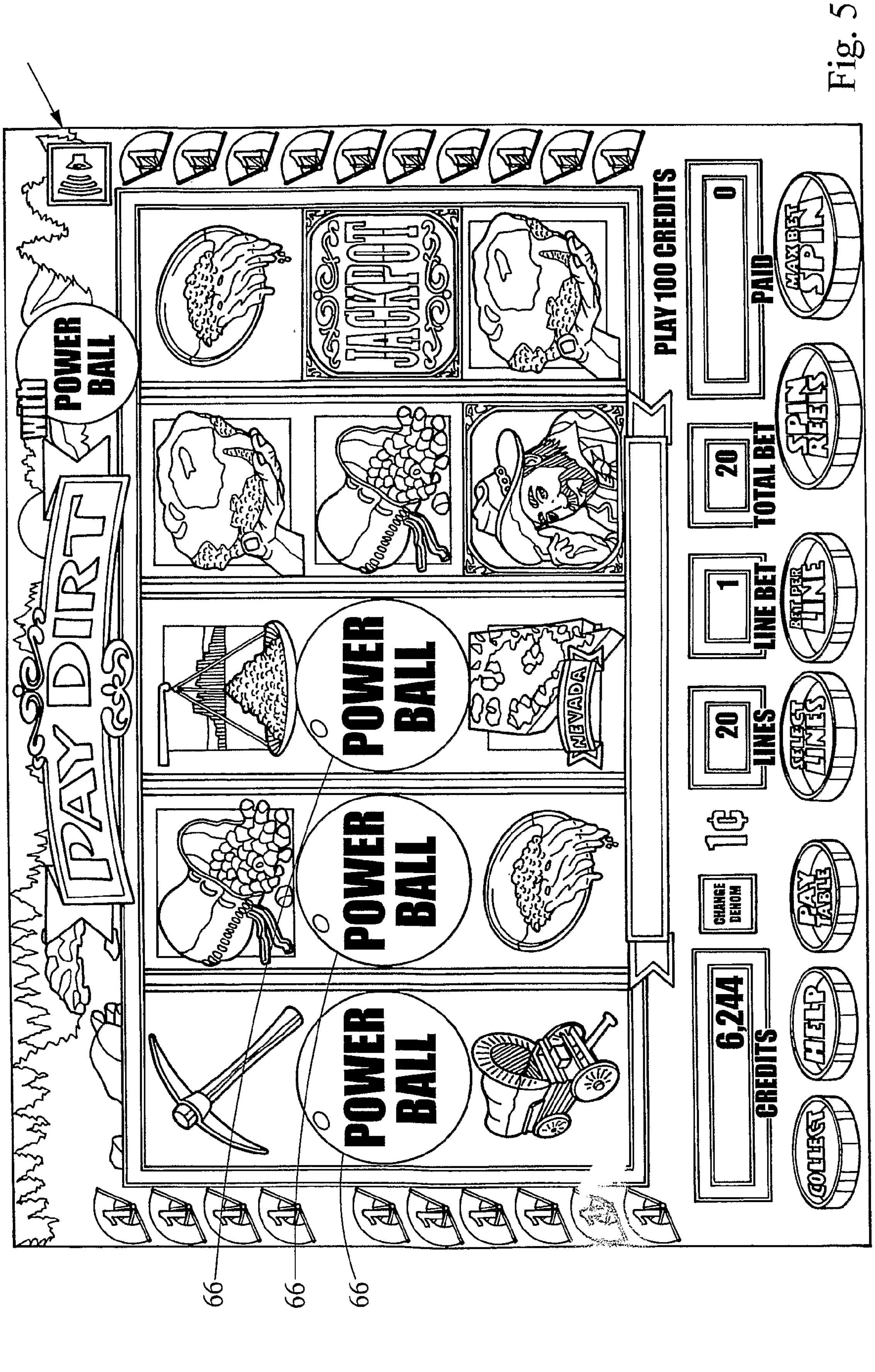
FIG. 5 is a base game screen representing a symbol arrangement for triggering a special game.

Referring to FIG. 5, an array of symbol-bearing reels is displayed on a base game window of the primary display 14 of one of the gaming machines 10*a*-10*e*. Each reel, when stopped, shows three symbols arranged in a top, middle, and bottom position. The symbol arrangement, as shown, includes three "Powerball" symbols 66 located in three respective reels. Each of the "Powerball" symbols 66 is located in the middle position of the respective reel. Assuming that the three "Powerball" symbols 66 have landed along an active payline, a special game is triggered.

Figure 6:
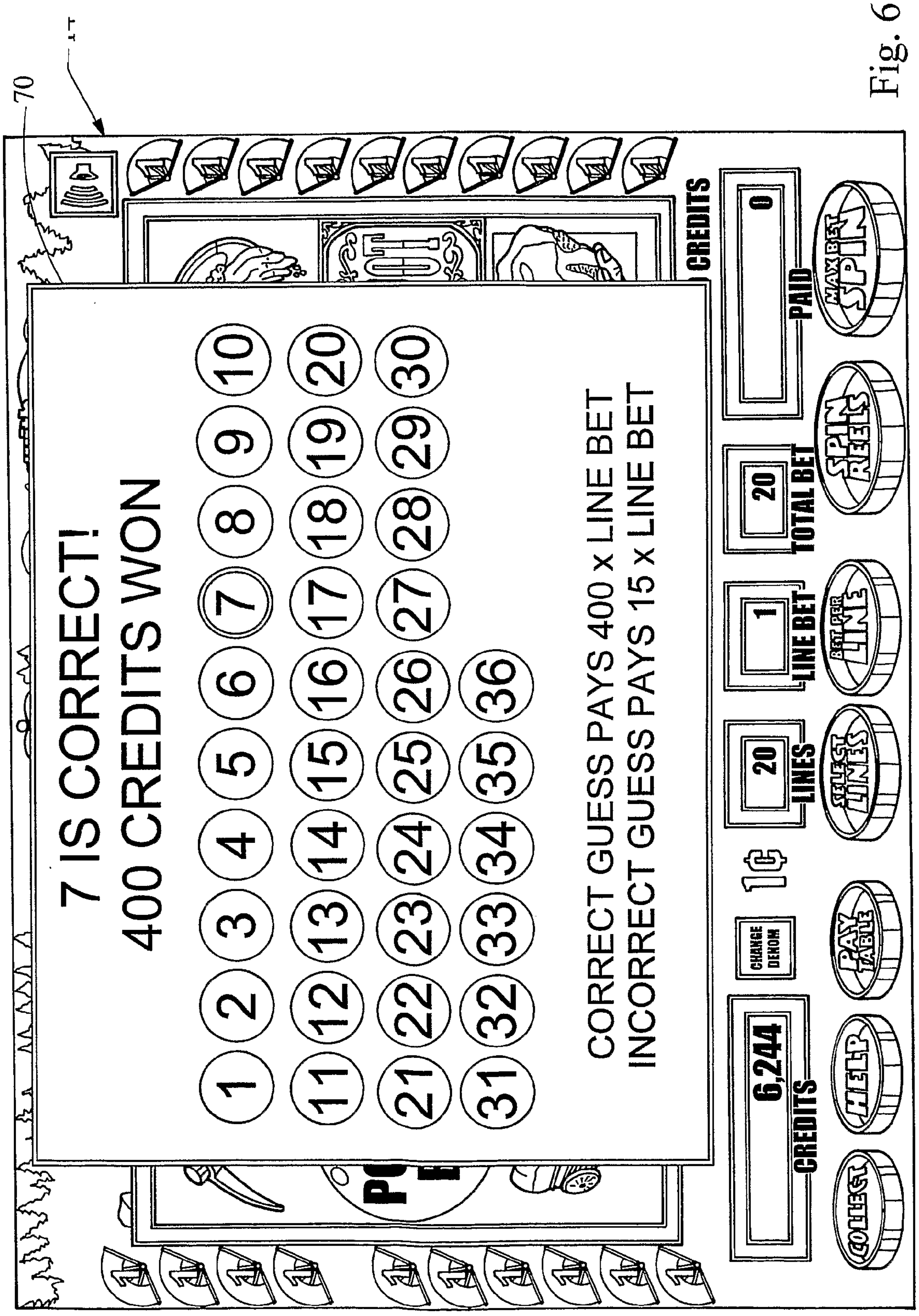
FIG. 6 is a special game screen displayed after an initial triggering of the special game of FIG. 5.

Referring to FIG. 6, a special window 70 is shown in the primary display 14, overlapping the base game window. The special window 70 is shown during an initial special round and includes a predetermined number of symbols, which are numbered accordingly. In this case, the special window 70 shows thirty six balls. The player is instructed to "Guess A Number," wherein a correct guess pays the payline wager multiplied by a multiplier, e.g., 400, and an incorrect guess pays the payline wager multiplied by a lesser multiplier, e.g., 15. Although the player is guaranteed a credit award regardless of whether he or she guesses correctly, the player has an incentive to guess correctly because a correct guess pays a larger credit award. Alternatively, the incorrect guess results in no payout.

If the guessed number matches one of the numbers hidden in the balls 62 (FIG. 4), the player receives the larger credit award, i.e., "400×Line Bet." The player, in this example, selects ball "7," which is a correct number. Thus, the selected ball "7" matches one of the hidden numbers of balls 62. Ball "7" is removed from the special window 70 and is now revealed in the corresponding ball 62 of the sign 60 (see FIG. 8). Optionally, ball "7" is not removed from the special window 70, and appears in subsequent special rounds. After selecting ball "7," the initial special round ends and the player is taken back to the base game window. The player can continue playing the base game or can discontinue playing. Alternatively, the player is allowed to make more than one selection during a single special round.

Figure 7:
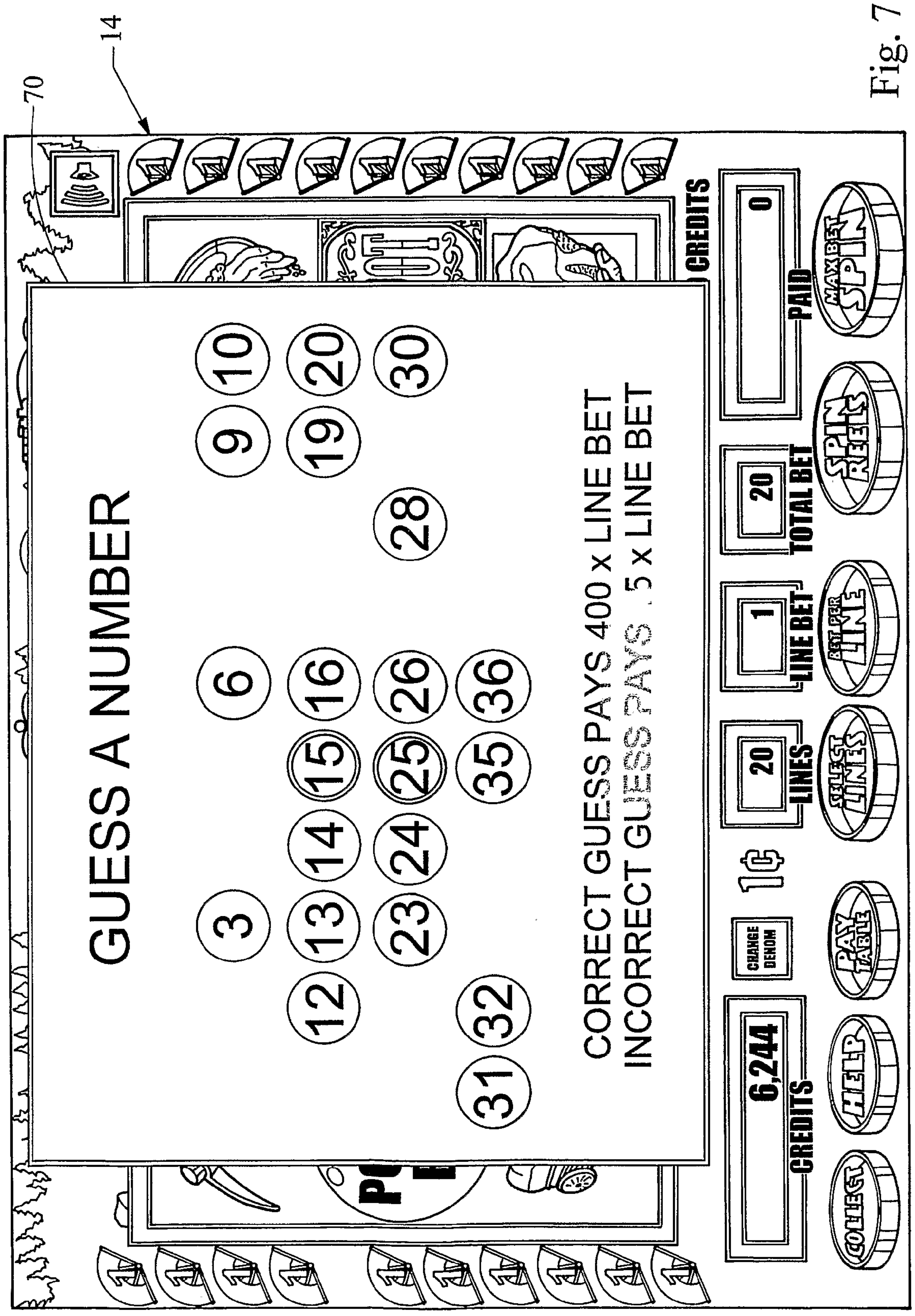
FIG. 7 is a special game screen displayed after a subsequent triggering of the special game of FIG. 5.

Referring to FIG. 7, the special window 70 is shown at a later time, during a subsequent special round. The subsequent special round has been triggered, similar to the initial special round, by landing three "Powerball" symbols along an active payline. Subsequent special rounds can be played by the same player of the initial special round or by a different player. Further, subsequent special rounds can be played at the same gaming machine of the initial special round or at a different gaming machine of the gaming system. Incorrect guesses pay the small credit award and the incorrect number is removed from the special window 70.

As time goes by, a player has less balls to select from the special window 70. In this embodiment, the special window 70 does not display any of the balls that have been selected during any previous special round. For example, ball "7," which was selected during the initial special round, has been removed. Similarly, balls "1," "2," "4," "8," "11," "17," "18," "21," "22," "27," "29," "33," and "34" have been removed during previous special rounds. During this subsequent special round, the player is allowed to make two selections. The player selects ball "15" and ball "25," each of which is a correct number. Thus, the player has won double the large credit award (2×400×Line Bet).

Figure 8:
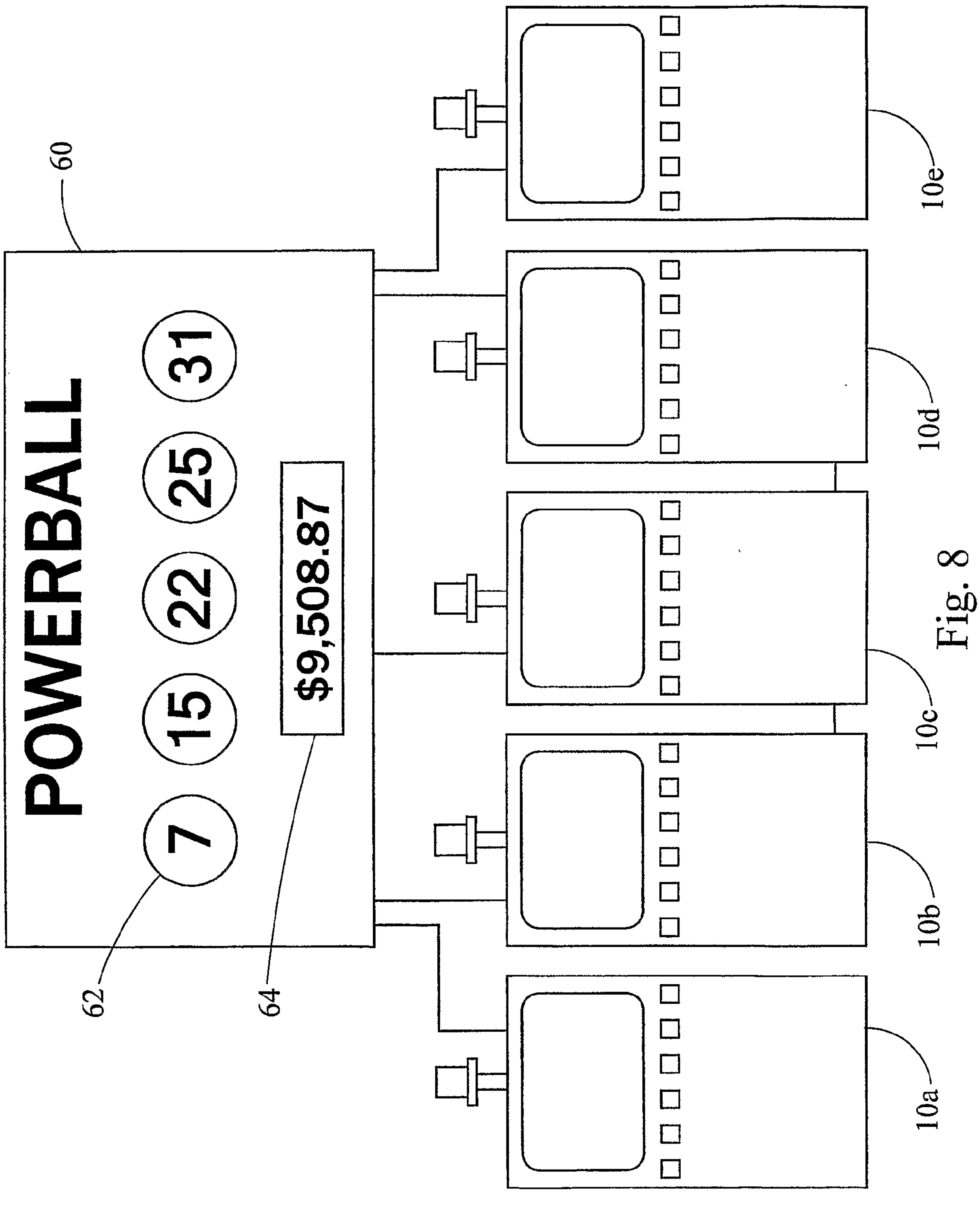
FIG. 8 is an illustration representing the plurality of gaming machines and the award sign of FIG. 4 when all the game balls have been found.

Referring to FIG. 8, the gaming system including gaming machines 10*a*-10*e* is now shown having all the balls 62 revealing a correctly guessed number. Accordingly, the "Powerball" numbers are "7 15 22 25 31." The players playing at any of the gaming machines 10*a*-10*e* observe, with anticipation, the revealing of each correct guess. After the last number is guessed, e.g., after ball "31" is guessed, the next player to achieve a special award condition wins the jackpot of "9,508.87."

Figure 9:
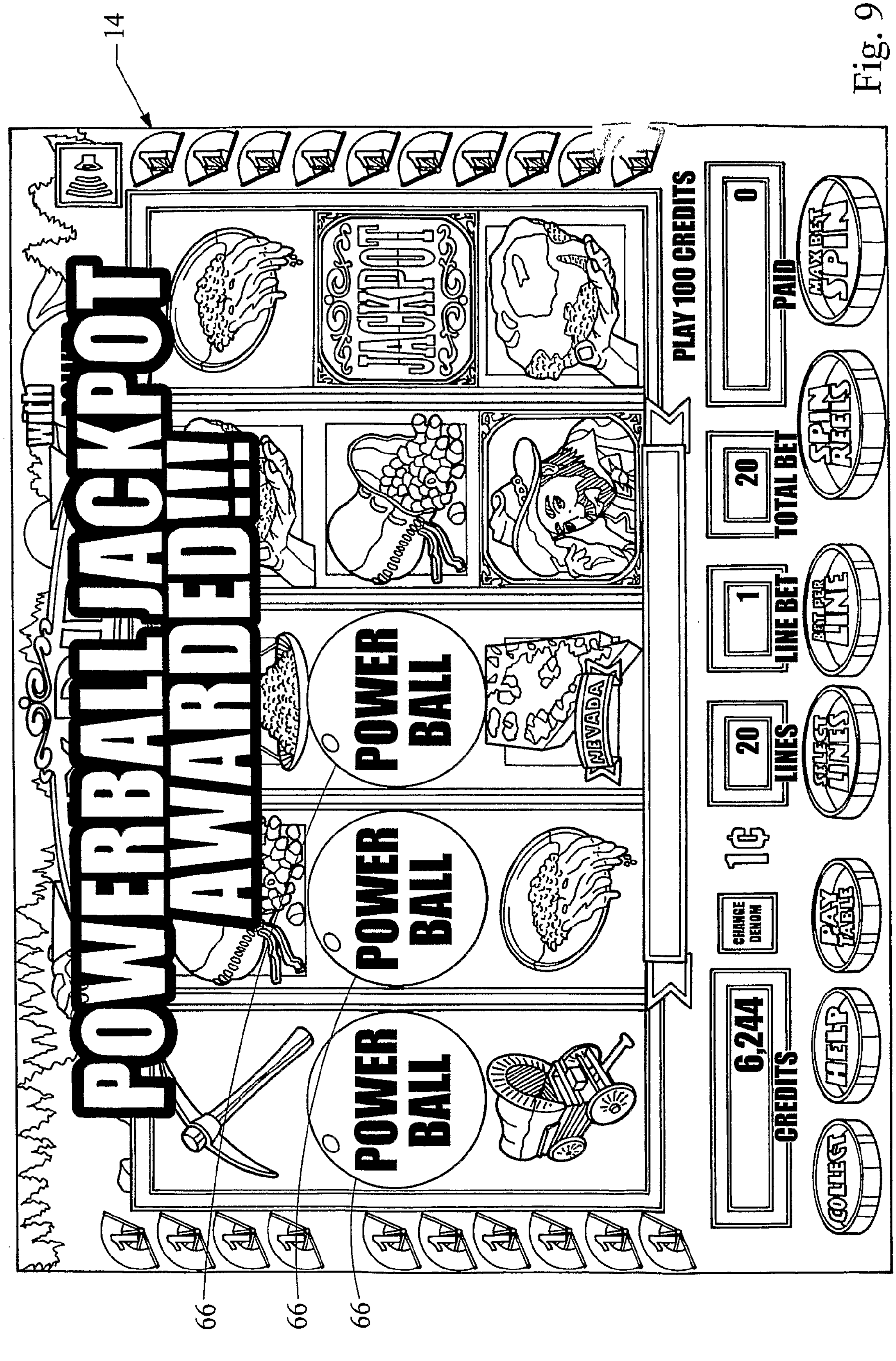
FIG. 9 is a base game screen representing a symbol arrangement for awarding a progressive award.

Referring to FIG. 9, the base game window shows that three "Powerball" symbols 66 have landed along an active payline. Assuming that the special award condition is for a player to obtain three "Powerball" symbols 66 along an active payline after all the "Powerball" numbers (which are revealed in the balls 62) have been correctly guessed, the player is awarded the jackpot. A notification visually notifies the player and, optionally, other players playing on any of the gaming machines 10*a*-10*e* that the "Powerball Jackpot [is] Awarded!!".

Alternatively, other triggering conditions can be used for triggering a special event. For example, one or more predetermined symbols can land anywhere on the base game window. Alternatively yet, the triggering condition is based on a player selection, not on a symbol arrangement. Optionally, the triggering condition is based on a mystery award. For example, the special event is triggered at random independent of the symbols appearing in the base game.

In other embodiments, the victory conditions are not related to number guessing. For example, a victory condition is fulfilled when a player correctly selects a hidden pea from under a shell. In another example, a victory condition is fulfilled when a player beats another player in a poker game. Alternatively, a victory condition is fulfilled when a predetermined symbol combination is achieved.

Instead of a jackpot award, a successful player that fulfills a special award condition can receive alternative and/or optional prizes. For example, the successful player can receive a set amount or a progressive award. Alternatively, the successful player can receive free games or qualifications for entry in other games and/or game tournaments.

Optionally, the player receives a set amount for fulfilling at least one of the plurality of victory conditions. Thus, in one embodiment the player award for fulfilling one of the victory conditions is a set amount that is independent of any active paylines.

While the examples described above refer to the special award condition being fulfilled when another special triggering condition occurs, the special award condition can be fulfilled when other conditions are met. For example, the special award condition can be fulfilled when the player completes a last piece of a puzzle. In another example, the special bonus award condition can be fulfilled when the player fulfills the last of the victory conditions, e.g., when the player correctly guesses the "Powerball" number "31."

Other examples of a group game in which each person contributes to overall group progress are listed below. In one exemplary group game, a map is divided into 100 squares, five of the 100 squares having a buried treasure. Each person of a group playing the group game is capable of finding one or more of the five buried treasures. When all five treasures are found, a special award (e.g., a big jackpot) is awarded.

In another exemplary group game, players guess a word or phrase, one letter at a time (e.g., similar to the game HANGMAN™). Each player is capable of contributing to guessing the entire word or phrase. When the entire word or phrase is guessed, a special award is awarded.

In yet another exemplary group game, players eliminate incorrect clues from subsets of clues in a murder mystery group game. The subsets of clues include motives, methods, time of death, etc. Each person of the group is capable of eliminating one or more clues, wherein the group as a whole progresses towards the common goal of solving the mystery. When the mystery is solved a special award is awarded.

In yet another exemplary group game, players place five objects in a correct order. Each player of the group contributes to obtaining the correct order of the objects. When all five objects are in the correct order, a special award is awarded.

In yet another exemplary group game, players calibrate the angle of fire and/or the strength of powder for a cannon to hit a target. Optionally, all previous attempts are shown. Using the previous attempts as a guide, each player of the group calibrates the cannon closer to hitting the target. To obtain a special award, the players must hit the target.

Each of these embodiments and obvious variations thereof is contemplated as falling within the spirit and scope of the claimed invention, which is set forth in the following claims.

What is claimed is:

1. A method of conducting a group wagering game and individual wagering games on a plurality of gaming machines, said group wagering game having a special award that is attainable by players at said plurality of gaming machines, the method comprising:

receiving wagers from players at said plurality of machines for playing said individual wagering games;

presenting on a community display a commonly shared group of victory conditions to be fulfilled during said group wagering game;

in response to a first triggering condition occurring during game play of at least one of said individual wagering games at one of said machines, presenting on a display an initial instance of said group wagering game including an opportunity to fulfill at least one of said victory conditions, wherein fulfilling by one of said players of a victory condition of said victory conditions fulfills said victory condition for all of said players;

returning to play of said individual wagering games at said plurality of machines after playing said group wagering game during said initial instance; and in response to a second triggering condition occurring during game play of at least one of said individual wagering games at any of said machines and after fulfilling all of said victory conditions during one or more subsequent instances of said group wagering game, (i) displaying the fulfillment of all said victory conditions on the community display, and (ii) awarding said special award to the machine associated with said second triggering condition.

2. The method of claim 1, wherein at least one of said first triggering condition and said second triggering condition is selected from a group consisting of a symbol arrangement, a player-selectable pick, and a mystery award.

3. The method of claim 1, wherein at least one of said victory conditions is selected from a group consisting of selecting a correct number, selecting a correct hidden symbol, winning a poker hand, selecting a correct symbol combination, and solving a puzzle.

4. The method of claim 1, wherein a last victory condition of said victory conditions is fulfilled by a first player of said players, said special award being awarded to a second player of said players.

5. The method of claim 1, further comprising:

awarding a first award in response to fulfilling a victory condition of said victory conditions; and awarding a second award in response to not fulfilling said victory condition of said victory conditions.

6. The method of claim 5, wherein at least one of said first award and said second award is a multiplier of an award associated with at least one of said individual wagering games.

7. The method of claim 1, further comprising:

providing a plurality of selectable options during said initial instance of said group wagering game, said plurality of selectable options representing said victory conditions; and removing selected ones of said plurality of selectable options in at least one of said one or more subsequent instances of said group wagering game.

8. The method of claim 1, wherein said second triggering condition is a repeat condition of said first triggering condition.

9. A non-transitory computer readable storage medium or media is encoded with instructions for directing a gaming system to perform the method of claim 1.

10. A gaming system having a plurality of gaming machines for playing a wagering game, comprising:

a display for displaying a base game of said wagering game in response to receiving a wager from at least one of multiple players, said wagering game further including a group wagering game;

a community display for displaying a commonly shared group of victory conditions to be fulfilled; and a controller coupled to the display and to the community display and programmed to present on the community display the commonly shared group of victory conditions, wherein fulfilling a victory condition of said victory conditions by one player of said multiple players fulfills said victory condition for all of said multiple players, present one or more rounds of said group wagering game in response to a respective occurrence of a triggering condition during game play of said base game, and after all of said plurality of victory conditions are fulfilled in said one or more rounds of said group wagering game and in response to another triggering condition during game play of said base game that occurs after fulfilling all of said plurality of victory conditions, (i) award a special award to a player of the multiple players that fulfills a special award condition and (ii) display on the community display the fulfillment of all the victory conditions.

11. The gaming system of claim 10, wherein said community display includes a plurality of game balls, each of said game balls revealing a hidden number when a corresponding one of said victory conditions is fulfilled.

12. The gaming system of claim 10, wherein at least one of said plurality of gaming machines is selected from a group consisting of slot machines, poker machines, and keno machines.

13. The gaming system of claim 10, wherein said controller is further programmed to provide a plurality of selectable options during an initial round of said group wagering game, said plurality of selectable options representing said victory conditions, and remove selected ones of said plurality of selectable options in subsequent rounds of said group wagering game.

14. The gaming system of claim 10, wherein said controller is further programmed to select a victory condition of said victory conditions from a group consisting of selecting a correct number, selecting a correct hidden symbol, winning a poker hand, selecting a correct symbol combination, and solving a puzzle.

15. The gaming system of claim 10, wherein said controller is located in one of said plurality of gaming machines.

16. A method for conducting a wagering game on a gaming system, comprising:

receiving wagers from a plurality of players for playing said wagering games, each player of the plurality of players playing on a respective gaming machine of the gaming system;

in response to achieving special triggering conditions during game play of said wagering games, presenting respective one or more players of the plurality of players with respective rounds of a special event;

presenting on a community display a commonly shared group of victory conditions to be fulfilled;

fulfilling all of said victory conditions based on selections made by said one or more players during said rounds of said special event, wherein fulfilling by one of said players of a victory condition of said victory conditions fulfills said victory condition for all of said players;

displaying on the community display the fulfillment of all said victory conditions;

providing an opportunity to achieve a special award requirement after fulfilling all of the plurality of victory conditions; and in response to achieving the special award requirement, awarding a special award of the special event to a player of the respective gaming machine on which the special award requirement was achieved.

17. The method of claim 16, further comprising awarding a bonus award in response to fulfilling one of said victory conditions.

18. The method of claim 16, further comprising selecting one of a plurality of selectable options during said rounds of said special event, said plurality of selectable options representing said victory conditions.

* * * * *